United States Patent [19]

Tehrani

[11] Patent Number: 5,430,574
[45] Date of Patent: Jul. 4, 1995

[54] RUGGED OPTICAL FILTER AND SWITCH FOR COMMUNICATION NETWORKS

[75] Inventor: Mohammad M. Tehrani, Westlake Village, Calif.

[73] Assignee: Litton Systems, Inc., Woodland Hills, Calif.

[21] Appl. No.: 279,731

[22] Filed: Jul. 25, 1994

[51] Int. Cl.⁶ .................................... G01B 9/02
[52] U.S. Cl. ........................... 359/378; 356/352; 359/379
[58] Field of Search .................. 359/577, 578, 579; 356/352; 372/107

[56] References Cited

U.S. PATENT DOCUMENTS

| | | | |
|---|---|---|---|
| 3,697,182 | 10/1972 | Erickson et al. | 356/352 |
| 4,142,958 | 3/1979 | Wei et al. | |
| 4,173,442 | 11/1979 | Snyder | 356/352 |
| 4,400,058 | 8/1983 | Durand et al. | 359/578 |
| 4,448,486 | 5/1984 | Evans | 359/578 |
| 4,453,804 | 6/1984 | Evans | 359/578 |
| 4,525,067 | 6/1985 | Hernandez | 356/352 |
| 4,553,816 | 11/1985 | Durand et al. | 359/578 |
| 4,609,822 | 9/1986 | Roche | 356/352 |
| 4,793,908 | 12/1988 | Scott et al. | |
| 5,116,128 | 5/1992 | Hall et al. | 356/350 |
| 5,116,131 | 5/1992 | Farahani et al. | 356/350 |
| 5,142,414 | 8/1992 | Koehler | 359/578 |
| 5,289,552 | 2/1994 | Miller et al. | 356/352 |
| 5,375,181 | 12/1994 | Miller et al. | 356/352 |

*Primary Examiner*—Martin Lerner
*Attorney, Agent, or Firm*—Wilfred G. Caldwell; James F. Kirk; Chester E. Martine, Jr.

[57] ABSTRACT

The rugged filter/switch cavity includes at least a two section low thermal expansion glass tubular frame, each section with a highly polished edge for abutting engagement and rigid gripping by electrostatic attraction to maintain the cavity integrity. Each frame section supports a multi-layer low loss thin film mirror in opposing relation to define the cavity gap. One mirror is fixed in the first section and the other mirror is carried by a diaphragm portion of the other section for axial movement toward and away from the first mirror to tune the cavity to different frequencies. Coaxially aligned optical fibers, affixed to each section by flexible epoxy, guide light from a broadband source including, one or more signals, into the first section, through the first mirror and back and forth between mirrors until the cavity is resonant to a signal to be selected which signal then exits the cavity via the second mirror and the other optical fiber. The cavity is tuned by piezo electric transducers moving the diaphragm to change the gap. A predetermined potential applied to the transducers will select the desired filter frequency. To switch between signal frequencies, control means capable of exhibiting or storing potentials or control signals similarly selects the gap setting corresponding to the frequencies to be switched.

17 Claims, 5 Drawing Sheets

RUGGED OPTICAL FILTER AND SWITCH FOR COMMUNICATION NETWORKS

BACKGROUND OF THE INVENTION

1. Field of the Invention

The invention provides optical filtering and switching, especially for communication networks and information highways.

2. Prior Art

Fabry-Perot Interferometers reveal structures similar to the devices of the present invention, and U.S. Pat. Nos. 5,116,128 Mirror Transducer Assembly For Ring Laser Gyroscopes to D.B. Hall and S.R. Farahani, and 5,116,131 Mirror Transducer Assembly For Ring Laser Gyroscopes to S.R. Farahani and the present inventor reveal the use of piezo electric chips to axially deflect membranes to move mirrors.

However, the prior art fails to teach rugged filter/switches capable of withstanding hard knocks, providing stability of operation and amenability to mass production, as well as versatility, due to structural design and materials.

SUMMARY OF THE INVENTION

The invention includes structures and methods for selectively filtering out a signal from a broadband light source and for switching from recovering one signal to recovering other signals.

A frame of extra low expansion glass comprising two or more sections supports two spaced apart thin-film mirrors, defining a cavity, with one mirror being fixed in the non-movable frame section, and the other mirror being carried by a frame diaphragm so that the gap between the mirrors can be changed. The frame sections are preferably closed end tubes with the diaphragm end including an axial projection supporting the other mirror. Also, the abutting edges of each tubular section are highly polished so that electrostatic attraction holds the frame together (optical contacting).

In a preferred embodiment a broadband light source supplies light, preferably in the 1530-1570 nanometer range, including one or more signals, to a light path which penetrates the one frame section, the fixed mirror and bounces back and forth between the mirrors until the gap is adjusted to make the cavity resonant to the frequency of the signal to be selected, at which time the light path is extended through the movable mirror, projection and frame diaphragm to escape the filter or switch device.

Preferably, piezo electric chips are carried by the diaphragm, on both sides thereof, to change the gap in accordance with the magnitude and polarity of control signals applied to the piezoelectric chips connected in bimorph configuration.

In the switch option of this invention, a control arrangement is used to select more than one signal frequency output by applying the proper voltage to the piezoelectric chips to change the cavity gap so the filter switch will only pass each selected signal frequency.

DESCRIPTION OF THE PREFERRED EMBODIMENT

With the advent of low loss, highly stable multi-layer thin film mirrors, the present invention became possible to provide a novel rugged, stable and mass producible small filter switch device for fiber optic communication networks. Suitable thin film mirrors can be made using the teachings of U.S. Pat. Nos. 4,142,958 issued Mar., 1979 to D. Wei and A. Louderback for a Method For Fabricating Multi-Layer Optical Films having a common assignee with this patent application, the disclosure of which is incorporated herein by reference and 4,793,908 issued Dec. 27, 1988 to G. Scott and C. Kohlenbergher, and D. Warren for a Multiple Ion Source Method and Apparatus For Fabricating Multilayer Optical Films, assigned to Rockwell International Corporation and the disclosure of which is also incorporated herein by reference.

The number of layers in a quarter wave stack depends on the degree of desired reflectance and the differences in refractive indices of the layers. Ring laser Gyro mirrors usually consist of 17 to 25 quarter wave thin film optical layers deposited on a substrate. Each layer is 500 to 800 angstroms thick and usually the alternating high index material is titanium dioxide and the sandwiched low index material is silicon dioxide. These laser quality multi-layer thin film mirrors exhibit the low loss, highly stable, durable narrow bandwidth filter type mirrors suitable for use in the present invention, and susceptible to being mass produced in large batches.

Figure 1:
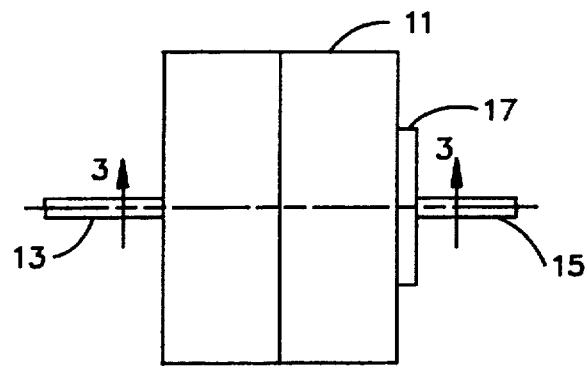
FIG. 1 is a side elevational view of the small compact filter/switch cavity structure of the invention.
Figure 2:
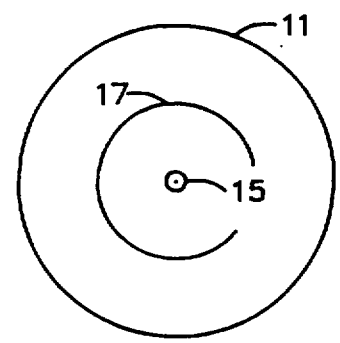
FIG. 2 shows the structure of FIG. 1 in end elevation.

In FIG. 1, the filter/switch cavity structure is contained in small enclosure device 11, which has affixed thereto input optical fiber 13 and output optical fiber 15. Also visible in FIGS. 1 and 2 is a doughnut shaped piezo electric or similar transducer 17.

Figure 3:
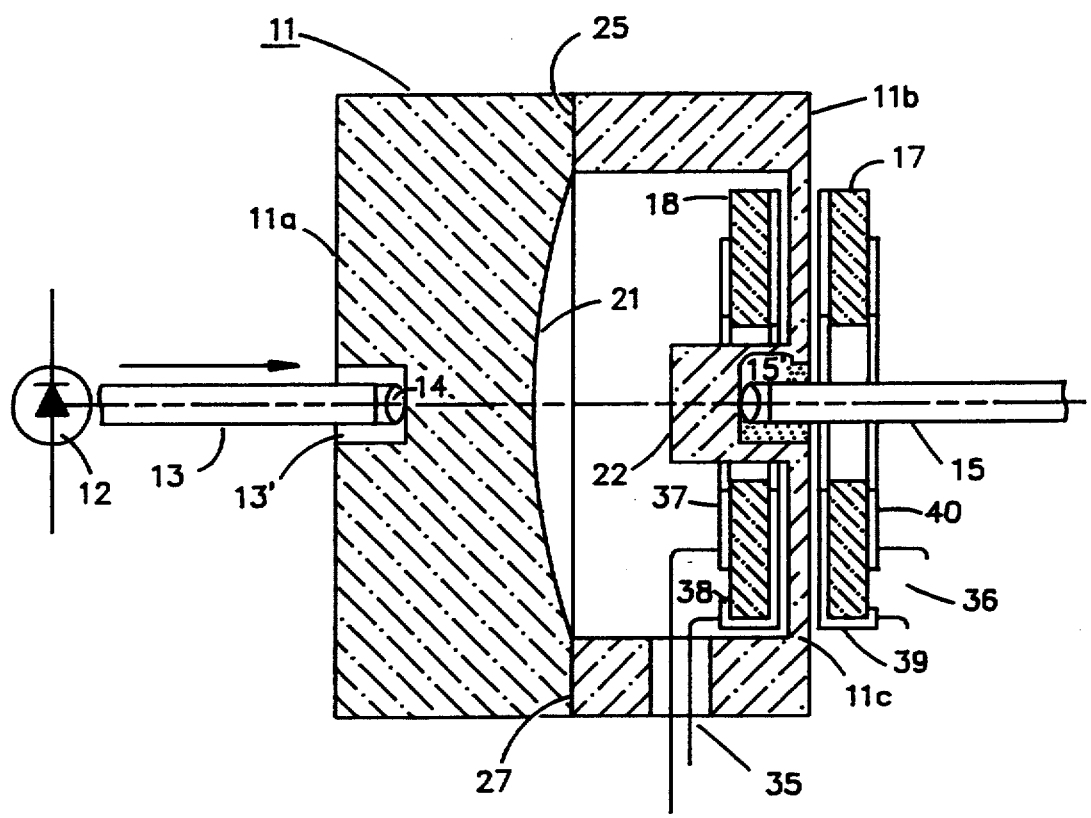
FIG. 3 shows the structure cross section, taken along the plane 3—3 of FIG. 1.

From the cross section FIG. 3, the materials may best be identified as mirror section 11a and mirror section 11b, both being low thermal expansion material, selected from Zero-Dur, trademark by Schott Glass, Cervit, trademark by Owens-Illinois, ULE or other suitable low expansion glass.

Section 11a includes a mirror surface 21 which is the first or one mirror and section 11b includes mirror surface 22 which is the second or other mirror. These are the multi-layer thin film mirrors on their glass substrates, sections 11a and 11b.

The abutting edges of sections 11a and 11b, shown at 25, 27, are highly polished and pressed together in a jig in perfect alignment so the vanderpohl electrostatic forces will rigidly maintain this alignment which also makes optic fibers 13 and 15 perfectly coaxially aligned.

The optic fibers 13 and 15 are maintained in position by flexible epoxy 13' and 15' which permits some fiber stretching without misalignment.

The rear wall 11c of section 11b is thinner than the other parts of the frame comprising sections 11a and 11b to serve as a diaphragm, permitting movement of mirror 22 toward or away from mirror 21 to change the gap therebetween and of course the resonant frequency of cavity 31.

Movement of the diaphragm is achieved by transducers, such as the piezo electric doughnut shaped chips 17 and 18. These transducers are carried by the diaphragm 11c on either side thereof and connected in bimorph fashion over wires 35 and 36 extending to metallized faces 37, 38 and 39, 40 on the transducers 18 and 17.

The transducers are affixed to the diaphragm by suitable glue or adhesive, shown as tiny black blobs.

In operation, the device 11 of FIG. 3 receives light from a conventional broadband light source, shown at 12, containing one or more signals. The frequency response of the cavity 31 may, for example, include 1530 to 1570 nanometers, and this range can be changed by spacer rings which extend the cavity length between mirrors and the coating thereon, as in FIGS. 4, 6 and 7.

Light from the source is received over optical fiber 13 which includes a mode matching and focussing lens 14 in its proximal end. These fibers are available as SELFOC, registered trademark of Nippon Sheet Glass Co. Ltd. division NSG America, Inc., 28 World's Fair Dr., Somerset, N.J. 08873. The product is called Fiber Collimators. Model FCC-LBR can be used for both 1300 nm and 1550 nm wavelengths.

The light entering fiber 13 is focussed and caused to pass through mirror 21 and be reflected from mirror 22, back and forth in cavity 31. Selective positioning of mirror 22 by transducers 17, 18 will cause the cavity to become resonant to one of the signals in the broadband light source, and this signal frequency will exit the cavity via mode matching and focussing lens fiber 15.

If the gap between mirrors 21 and 22 in FIG. 3 is X, then the relationship between gap and cavity resonant wavelength is:

$$X = \frac{C}{2FSR} = \frac{3 \times 10^{10} \text{ cms/sec}}{2 \times 3.750 \times 10^{12}/\text{sec}} = 40 \ \mu m$$

Figure 4:
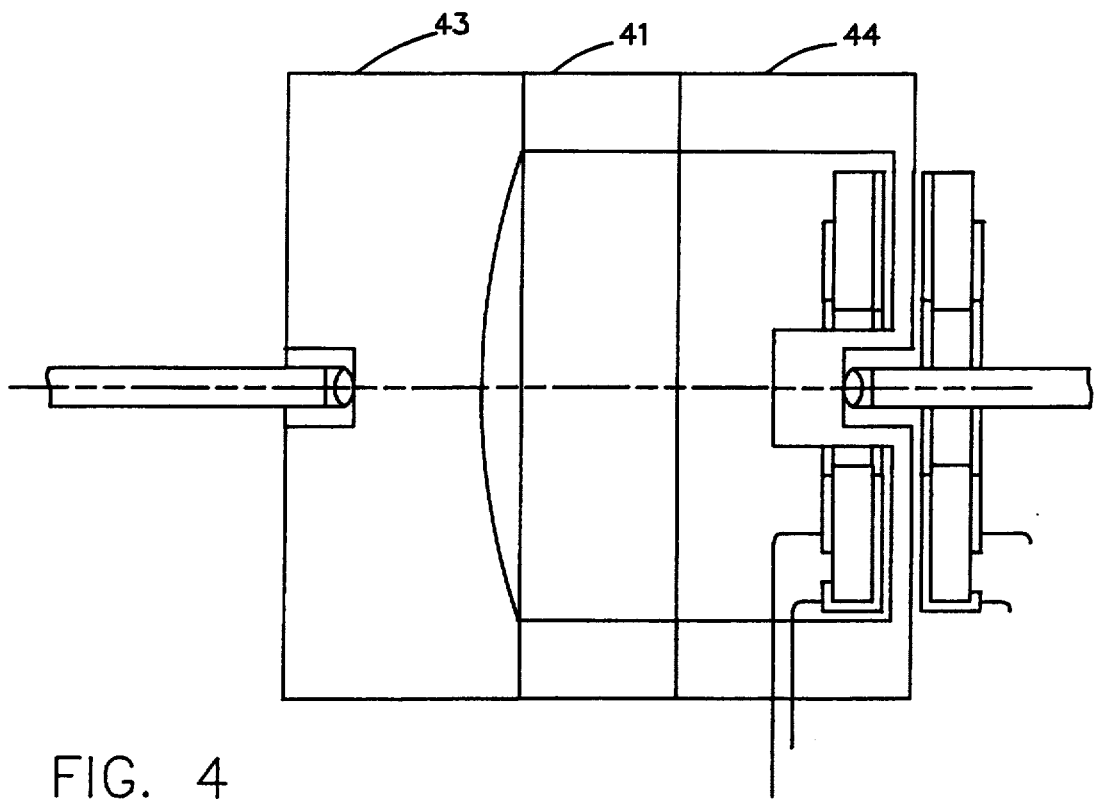
FIG. 4 shows the invention in cross section with a spacer used to lengthen the cavity gap between a flat mirror and a curved mirror.

The device of FIG. 4 only differs from FIG. 3 in that spacer ring 41 is inserted between the mirror sections 43, 44. This requires that the ring edges be highly polished in order to provide a rugged structure with sections 43 and 44.

Figure 5:
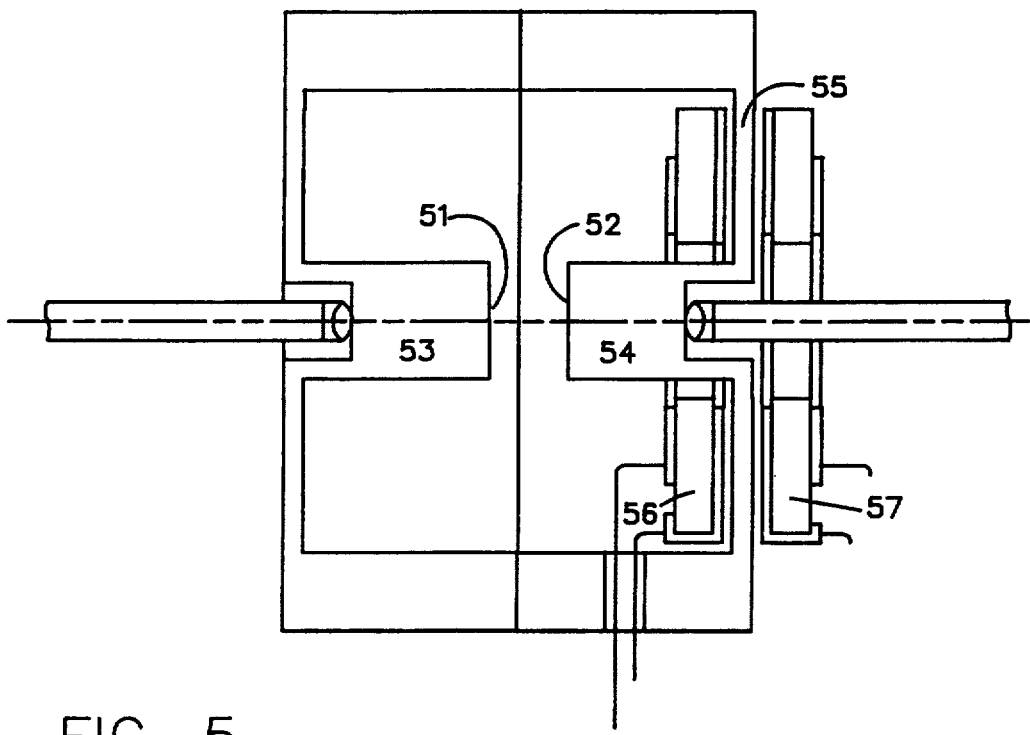
FIG. 5 is a cross sectional view of the invention using two flat mirrors and two pedestals carrying the mirrors.

In FIG. 5 two flat mirrors 51, 52 are respectively carried by pedestals 53, 54, but only the diaphragm 55 is movable due to transducers 56 and 57.

Figure 6:
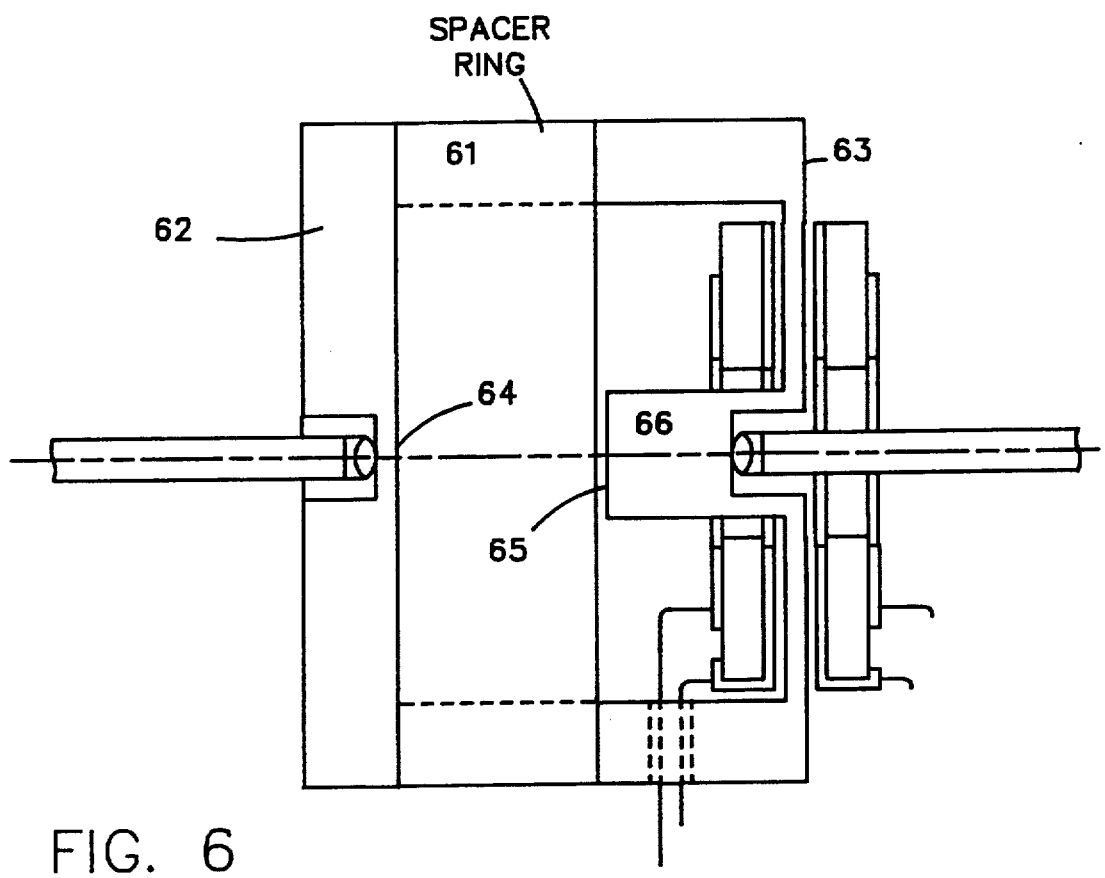
FIG. 6 is a further cross sectional view showing a spacer inserted to lengthen the gap between two flat mirrors, one supported by a pedestal.

In FIG. 6, spacer ring 61 is shown inserted between mirror sections 62, 63. Mirror 64 is a flat mirror and mirror 65 is a flat mirror on movable pedestal 66.

Figure 7:
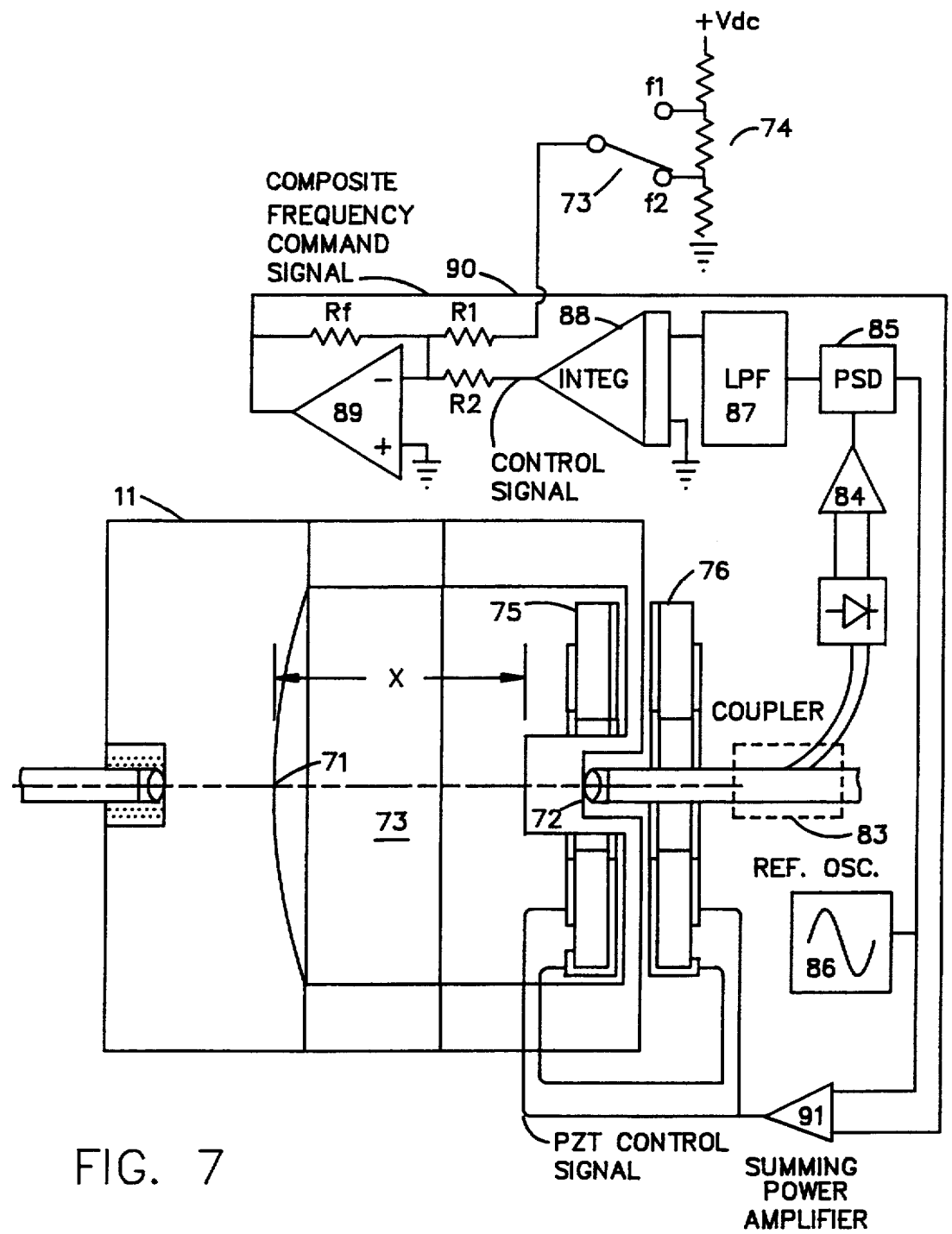
FIG. 7 shows an arrangement for supplementing the filter cavity with components connected together to enable the switching of the selection of different frequency signals; and, FIG. 8 is a schematic representation of a wavelength division multiplexing (WDM) network which use the tunable optical filter to provide switching across various wavelengths.

In FIG. 7, there is shown a filter 11 adapted to serve as a switch wherein mirror 71 is spaced by an amount from mirror 72 and electrical components have been added to permit hand switch 73 to select a voltage from potentiometer 74 sufficient to cause the transducers 75, 76 to drive mirror 72 to a position that will cause the cavity 73 to select a frequency $f_2$.

Other frequencies, such as $f_1$ may be selected in lieu of $f_2$ by operation of switch 73 to the $f_1$ position.

Diode 81 receives a portion of the light from coupler 80 and converts a small sample of the output selected light in fiber 83 to electrical signal for amplification in the high gain transconductance amplifier 84.

The amplified electrical signal is applied to PSD (phase sensitive detector) 85 which is switched on and off by reference oscillator 86, typically at 10 kilocycles. The PSD 85 output to LPF (low pass filter) 87 is typically only a few tens of millivolts which drives INTEG (integrator) 88. INTEG 88 provides a control signal of positive or negative polarity via the R2 input to summing amplifier 89. Potentiometer 74 provides an $f_2$ frequency command signal via hand switch 73 and input resistor R1 to summing amplifier 89. The summing amplifier 89 adds and scales the $f_2$ frequency command signal and the control signal to provide a composite frequency command signal on signal lead 90 to an input of the summing power amplifier 91. REF. OSC (reference oscillator) 86 provides a reference signal to a second input of SUMMING POWER AMPLIFIER 91 which adds the reference oscillator signal to the composite frequency command signal to provide a PZT (transducer) control signal to dive the electrodes on PZTs 75,76 to tune the cavity 73 to be resonant at frequency $f_2$.

The PZT control signal output from the lock-in amplifier control circuit slews the center frequency of the cavity to $f_2$ and varies the tuning point of the cavity above and below the center frequency at a reference oscillator rate until the filtered error signal from the LPF 87 to INTEG 88 obtains a net value of zero volt seconds over the reference oscillator period on average. A net zero volt seconds signal input into the INTEG input causes the integrator output to stop changing and to remain fixed in value for until the filtered error signal assumes a value other than zero.

Balance is attained and the movement of mirror 72 is stopped, except for the slight modulation of its position above and below the $f_2$ center frequency, due to the reference oscillator signal to the SUMMING POWER AMPLIFIER input. Now, the $f_2$ frequency is selected due to the summation of the $f_2$ command signal with the control signal to form a scaled composite frequency command signal that drives the PZTs to adjust the cavity gap to be resonant at a center frequency $f_2$. It is apparent to those skilled in the art that the circuit values and scale factors can be designed to switch or drive the cavity path length to select a center frequency $f_1$ in response to the operation of switch 73 to position $\overline{f_1}$.

Figure 8:
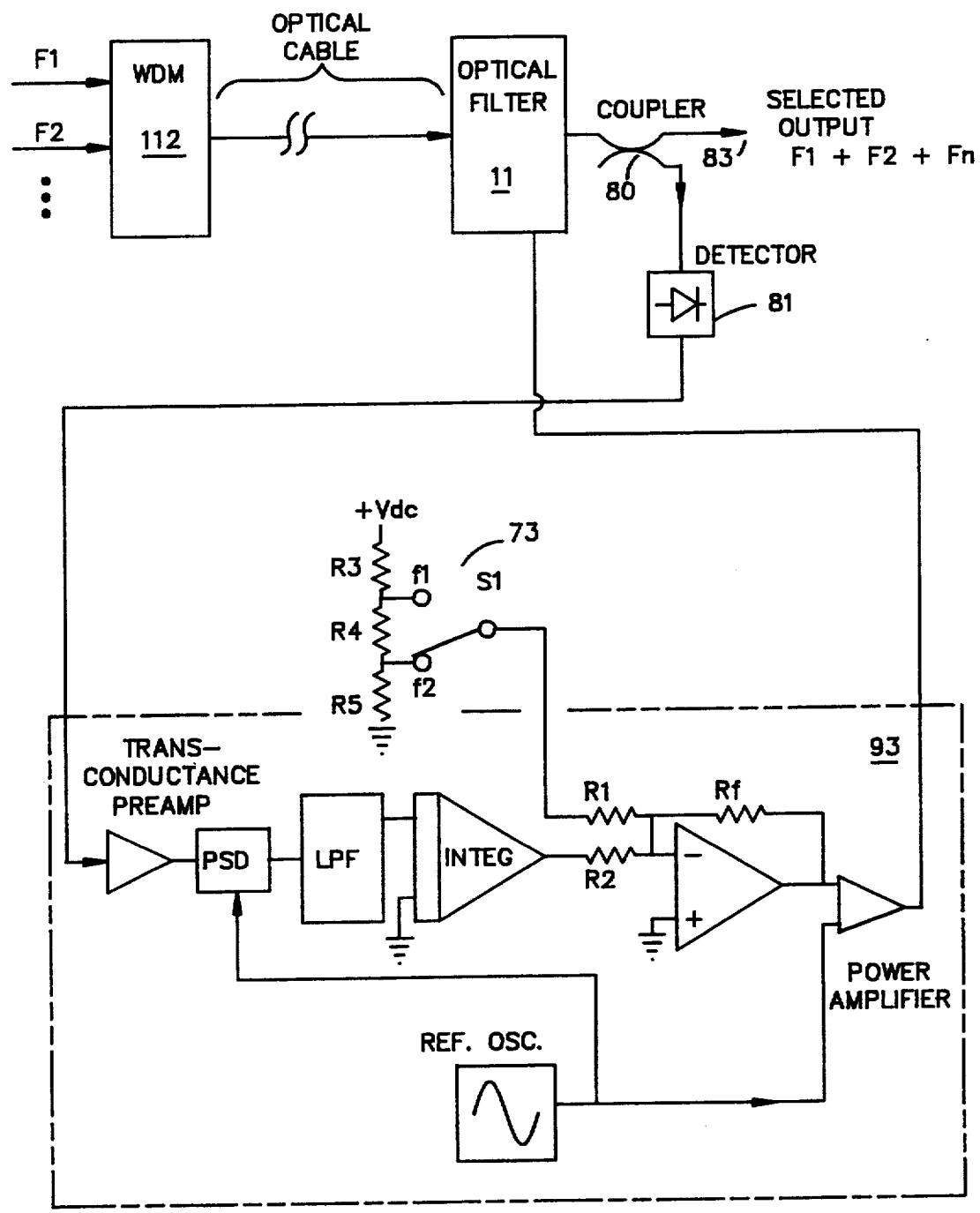

FIG. 8 shows the invention optical switch comprising the optical filter 11 with coupler 80, lock-in amplifier within phantom block 93 and switch 73 in combination to control select or switch the output frequency of a communications network having input optical frequencies F1, F2, ... etc. into WDM (wavelength division multiplexing) 112. In the arrangement of FIG. 8, operating switch 73 to position $f_2$ will select an output frequency from coupler 80 output 83 having frequency F2 as described in connection with the discussion of FIG. 7 above. It should be understood that the frequency command signal from switch 73 could also be provided, in the alternative, by other means such as the output from a digital to analog converter controlled by digital commands on a digital buss from a remote digital command signal source.

Tunable fiber fabry-perot filters such as the FFP 100 from Micron Optics, Inc., 2801 Buford Hwy., Suite 140, Atlanta, Ga., 30329 are commercially available; however, such filters are not known to provide the rugged characteristics and stability and simplicity of the invention filter and switch 11. Off the shelf slope detection or lock-in amplifier circuits are also available commercially from companies such as Stanford Research at Stanford, Calif. or Princeton Research, at Princeton, N.J.; however, it is not believed that such control circuit means have ever been combined with a filter such as the rugged filter 11 and a circuit for providing a frequency command signal for the selection of or commutation of a single frequency from a plurality of frequencies from an optical distribution system such as the frequencies into WDM 112.

Accordingly there has been described an apparatus and method for selecting or switching to light having a first predetermined wavelength from a broadband light source having at least a first and a second predetermined wavelength center frequency. Although the invention has been disclosed and illustrated in detail, it is to be understood that the same is by way of illustration and example only and is not to be taken by way of limitation. The spirit and scope of this invention is to be limited only by the terms of the appended claims.

What is claimed is:

1. A method for selecting or switching to light having a first predetermined wavelength from a broadband light source having at least a first and a second predetermined wavelength signal center frequency comprising the steps of:
   making a rugged tubular frame from at least two low expansion tubular sections having highly polished edges for rigidly joining the sections through optical contacting electrostatic attraction;
   providing a rugged light cavity within the frame, said cavity having a mirror spaced from and in opposition to another mirror;
   making said mirrors low loss from multiple thin film layers by ion beam sputtering;
   directing light from the source into the cavity to cause the light to bounce back and forth between the mirrors;
   electrically adjusting the spacing between the mirrors until the cavity becomes resonant to the first predetermined wavelength to be selected; and,
   allowing the first predetermined wavelength to leave the cavity.

2. The method of claim 1, wherein the step of directing light from the source into the cavity further comprises:
   directing the light from the source through one mirror, and allowing the selected wavelength light to exit the cavity via the other mirror.

3. The method of claim 2, further comprising the steps of:
   forming one wall of the cavity as a frame diaphragm supporting the other of said mirrors; and,
   affixing electrical transducers to the diaphragm to adjust of the spacing between the mirrors to select one of the first or second predetermined wavelengths in response to an electrical command signal.

4. The method of claim 3, further comprising the step of:
   aligning said mirrors and said source to cause the light from the source to be coaxial with the exiting selected wavelength light.

5. The method of claim 4, wherein:
   making said one mirror concave in the direction of the other mirror; and,
   making said one mirror semi-transparent to the light from the source.

6. A rugged optical filter comprising in combination:
   an optical cavity and frame therefor;
   said frame comprising sections of hollow low expansion material, each having highly polished conforming edges rigidly held together along the polished edges by electrostatic force;
   a pathlength control mirror and an opposing mirror defining said optical cavity in the frame and each mirror supported by a different section;
   each mirror characterized by low loss highly stable construction;
   an input optical path guiding light from a broadband light source into said cavity via said opposing mirror;
   said input light including at least one optical signal having at least a first predetermined signal bandwidth having a first predetermined center frequency;
   said cavity characterized as being capable of becoming resonant to at least the first or the second predetermined signal in response to a respective first or second composite control signal;
   means including the pathlength control mirror, for positioning the cavity bandpass to select at least a first or second signal predetermined center frequency in response to a respective first or second electrical command signal; and,
   an output optical path for transmitting the selected first or second predetermined signal from the cavity.

7. The filter of claim 6, wherein:
   at least a portion of each of said optical paths comprise fiber optic fibers securely anchored to the respective sections.

8. The filter of claim 6, wherein:
   said means for positioning the cavity bandpass comprise a frame diaphragm connected to the pathlength control mirror; and,
   piezo electric transducers connected to the diaphragm.

9. The filter of claim 8, wherein:
   said frame comprises two abutting sections of low thermal coefficient glass holding said mirrors in spaced apart configuration;
   said sections having opposed optically polished edges for abutting engagement to be held together by said electrostatic attraction.

10. A rugged tunable optical filter or switch device comprising in combination:
    an ultra low expansion glass frame;
    a first mirror;
    a first section of the frame holding the first mirror;
    a second mirror;
    both mirrors comprising low loss highly stable thin film mirrors;
    a second section of the frame including a diaphragm movably holding the second mirror in spaced apart opposition to the first mirror;
    a cavity within the frame between the mirrors adapted to be resonant to at least a first or second predetermined signal frequency to be selected from light from a broadband light source;
    said frame sections having abutting edges optically polished to hold the frame together;
    a light path piercing both frame sections including the diaphragm and both mirrors to permit light from an external broadband source to pass through the first mirror, bounce back and forth between the mirrors with the cavity resonant predetermined signal frequency exiting the device via the second mirror and the diaphragm; and electrically actuable means for moving the diaphragm to predetermined positions thereby changing the cavity resonance to select predetermined signals of different frequencies.

11. The device of claim 10 wherein:
said first mirror is concave to said second mirror.

12. The device of claim 10 further comprising:
a frame spacer with optically polished edges interposed between the optically polished edges of said frame sections and held in place by electrostatic attraction to increase the spacing of said mirrors and change the range of predetermined signal frequencies selectable by said device.

13. The device of claim 10 wherein:
optical fibers comprise portions of said light path.

14. The device of claim 13, wherein:
flexible epoxy secures the optical fibers to the frame sections for external light communication with the cavity.

15. The device of claim 10 wherein:
said electrically actuable means comprise piezo electric transducers affixed to opposite sides of said diaphragm.

16. The device of claim 15 wherein:
said electrically actuable means further comprise switchable storage means storing predetermined signals in accordance with voltage magnitudes for application to said transducers to select said predetermined signals of different frequencies.

17. The method of filtering or switching signals contained in a broadband light source comprising the steps of:
providing at least a two section hollow frame wherein abutting edges of the sections are optically polished to cause electrostatic attraction thereof;

deploying a pair of spaced apart multi-layer thin film mirrors within the frame to define a cavity resonant to a signal frequency;

supporting one mirror from a diaphragm portion of one section of the frame;

establishing a light path including an entry mode matching and focussing optical lens fiber from the broadband light source through the other frame section and the other mirror into the cavity for reciprocal movement of light between the mirrors;

establishing an exit light path including an exit mode matching and focussing optical lens fiber for the resonant signal frequency out of the cavity via said one mirror, said one section and the diaphragm portion thereof; and, electrically changing the cavity resonant frequency to cause other signals to follow the exit light path.

* * * * *